(12) United States Patent
Jaman

(10) Patent No.: US 9,984,234 B2
(45) Date of Patent: May 29, 2018

(54) SECURE DOCUMENT IMPORTATION VIA PORTABLE MEDIA

(71) Applicant: HRB Innovations, Inc., Las Vegas, NV (US)

(72) Inventor: Mani Jaman, Overland Park, KS (US)

(73) Assignee: HRB Innovations, Inc., Las Vegas, NV (US)

(*) Notice: Subject to any disclaimer, the term of this patent is extended or adjusted under 35 U.S.C. 154(b) by 160 days.

(21) Appl. No.: 15/067,787

(22) Filed: Mar. 11, 2016

(65) Prior Publication Data

US 2017/0262632 A1 Sep. 14, 2017

(51) Int. Cl.
*G06F 21/53* (2013.01)
*G06F 21/76* (2013.01)
*G06F 21/56* (2013.01)

(52) U.S. Cl.
CPC ...... *G06F 21/566* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 2011/0197280 A1* | 8/2011 | Young | ............... | G06F 21/552 726/24 |
| 2012/0266244 A1* | 10/2012 | Green | ............... | G06F 21/566 726/24 |
| 2012/0304244 A1* | 11/2012 | Xie | ............... | G06F 21/00 726/1 |
| 2013/0227691 A1* | 8/2013 | Aziz | ............... | G06F 21/567 726/24 |

* cited by examiner

*Primary Examiner* — Fatoumata Traore
(74) *Attorney, Agent, or Firm* — Erise IP, P.A.

(57) ABSTRACT

System, method and medium for securely transferring untrusted files from a portable storage medium to a computer. The invention can filter, scan and detonate untrusted files to be transferred to a computer from a portable storage medium. First, the types of files which are eligible to be selected for transfer are limited, by file type and/or content. Second, each file selected for transfer is scanned against a collection of signatures of known malware. Thus, files contain malware which has been previously identified as such can be blocked from ever being transferred to the computer. Finally, each file to be transferred is detonated by opening it in a controlled, sterile environment to determine if it adversely impact the operation of that sterile environment. Malware detected in this way can then be added to the collection of malware that can be detected by the second step.

15 Claims, 4 Drawing Sheets

SECURE DOCUMENT IMPORTATION VIA PORTABLE MEDIA

BACKGROUND

1. Field

Embodiments of the invention generally relate to preventing the dissemination of malicious code and, more particularly, to the secure transfer of untrusted files from portable storage media.

2. Related Art

Traditionally, portable storage media have been a common transmission vector for malicious software (referred to herein as "malware") such as viruses and trojans. Conventional virus scanners are too slow to respond to files that are typically opened as soon as they are transferred onto a computer. Even on-access scanners suffer from slow updating of signature databases and inability to detect polymorphic malware.

At the same time, businesses are coming under increasing pressure to allow customers to bring in their own files on such portable media devices. For example, print shop customers may provide originals for print jobs in digital format via portable media devices, and tax preparation services are faced with customers who have tax forms and other tax data stored in digital form. Accordingly, there is a need for a secure method of file importation from portable storage media that keeps businesses' computers secure while allowing easy access to customers' digital files.

SUMMARY

Embodiments of the invention address the above-described need by providing for a multi-level security system for digital file transfer. In particular, in a first embodiment, the invention includes a system for the secure importation of digital files from a portable storage medium onto a computer storing a plurality of data files, comprising a quarantine engine with exclusive access to a data port to which the portable storage medium is connected, in turn comprising a file filter and picker interface, programmed to determine, for each data file of the plurality data files, whether the data file is permitted by a transfer policy, present, to the user, each permitted data file of the plurality of data files for selection, receive, from the user, a selected data file to be transferred to the computer, a malware scanner, programmed to compare the selected data file to each malware signature of a plurality of malware signatures, and transfer the data file to a local data store only if the selected data file does not match any of the plurality of malware signatures, and a detonation engine, programmed to a detonation engine, programmed to detonate the data file, monitor for aberrant behavior caused by the data file, if aberrant behavior is detected, determine that the data file contains malware and add a signature for the data file to the plurality of malware signatures, and if aberrant behavior is not detected, determine that the data file does not contain malware.

In a second embodiment, the invention includes a method of securely transferring a data file from a portable storage medium to a computer, comprising the steps of determining that the portable storage medium has been connected to a data port, accessing the portable storage medium using a quarantine engine with exclusive access to the data port, determining that the data file is permitted by a transfer policy to be transferred to the computer, presenting the data file to a user for selection, receiving, from the user, selection of the data file, comparing the data file against a plurality of malware signatures, determining that the data file does not match any of the plurality of malware signatures, transferring the file to a detonation engine, detonating the file in a controlled environment while monitoring for aberrant behavior, and detecting no aberrant behavior when the file is detonated and, in response, making the data file available to the computer.

In a third embodiment, the invention includes one or more computer-readable media storing computer-executable instructions that, when executed by a processor, perform a method of securely transferring a data file from a portable storage medium to a computer, comprising the steps of determining that the portable storage medium has been connected to a data port, accessing the portable storage medium using a quarantine engine with exclusive access to the data port, determining that the data file is permitted by a transfer policy to be transferred to the computer, presenting the data file to a user for selection, receiving, from the user, selection of the data file, comparing the data file against a plurality of malware signatures, determining that the data file does not match any of the plurality of malware signatures, making the data file available on the computer, transferring the file to a detonation engine, detonating the file in a controlled environment while monitoring for aberrant behavior, and detecting aberrant behavior when the file is detonated and, in response, generating a malware signature for the data file and adding it to the plurality of malware signatures.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
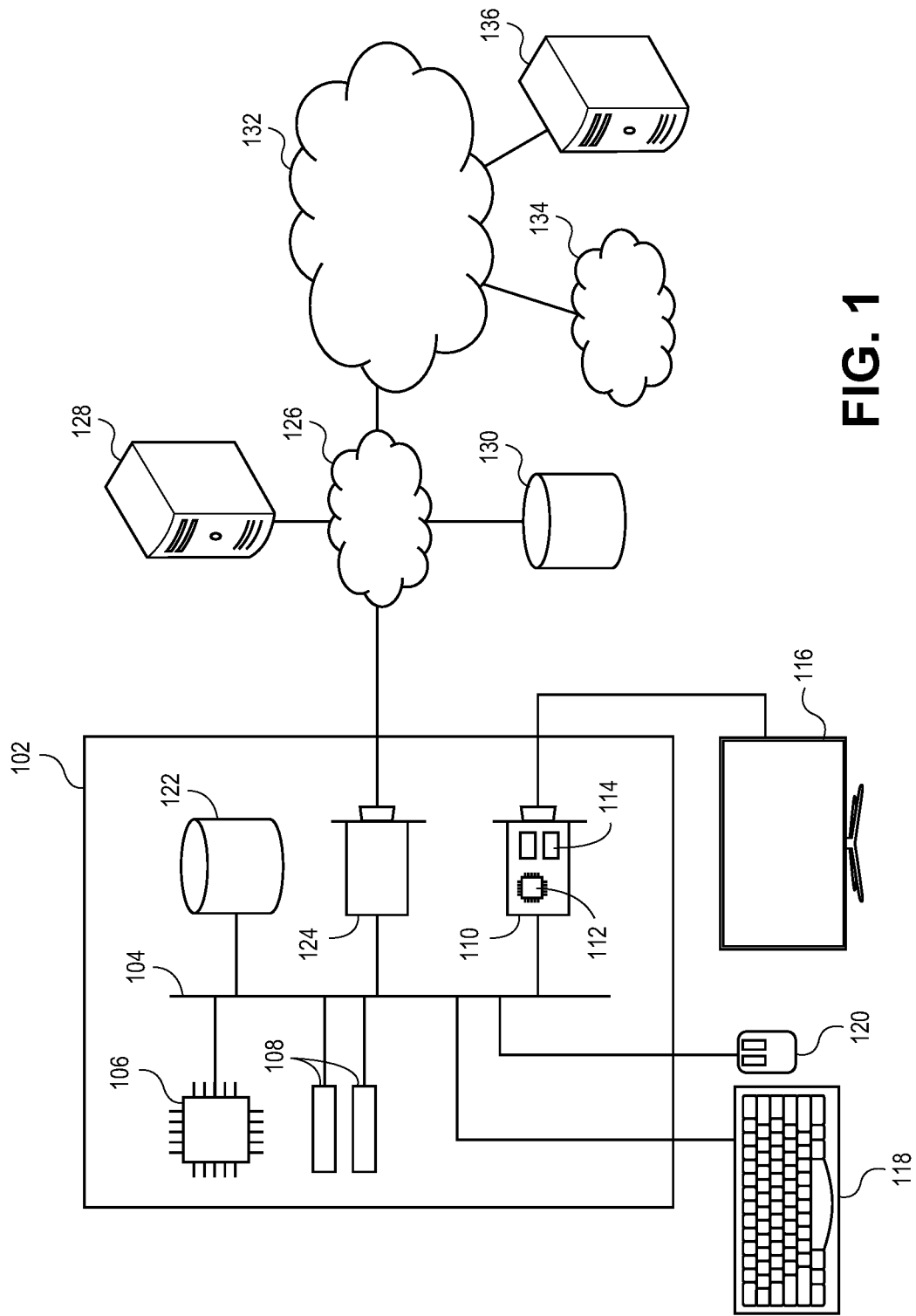
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention filter, scan and detonate untrusted files to be transferred to a computer from a portable storage medium. First, the types of files that are eligible to be selected for transfer are limited by file type and/or content. Thus, office documents cannot be selected for transfer to a computer intended for processing image files, and image files cannot be selected for transfer to a computer intended for processing office documents.

Second, each file selected for transfer is scanned against a collection of signatures of known malware. Thus, files containing malware which has been previously identified as such can be blocked from ever being transferred to the computer. Finally, each file to be transferred is "detonated" (analogous to the controlled detonation of a suspicious package) by opening it in a controlled, sterile environment to determine if it adversely impacts the operation of that sterile environment. Malware detected in this way can then be added to the collection of malware that can be detected by the second step.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Operational Environment for Embodiments of the Invention

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Operation of Embodiments of the Invention

Figure 2:
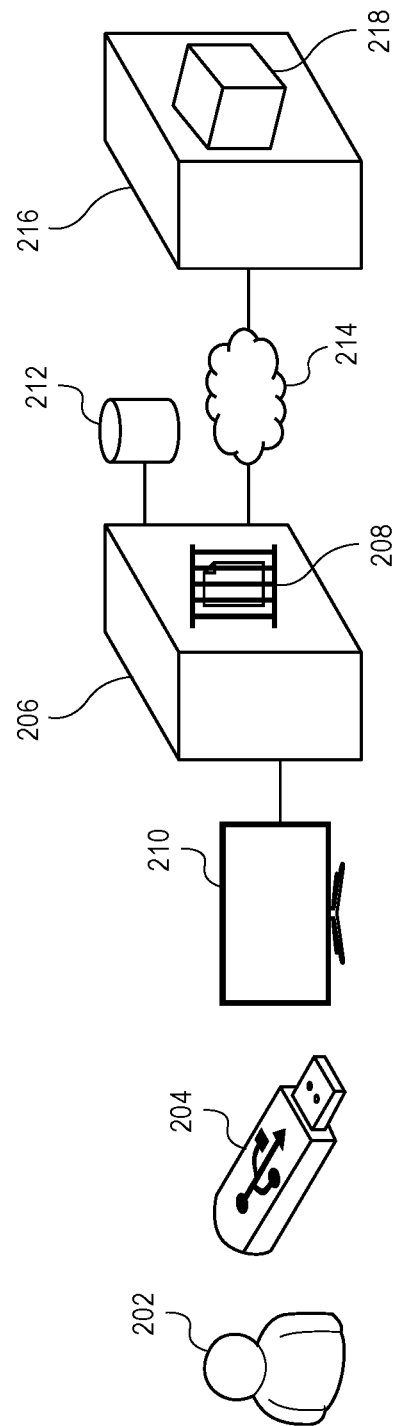
FIG. 2 depicts a system in accordance with embodiments of the invention.

Turning now to FIG. 2, a system in accordance with embodiments of the invention is depicted. User 202 has portable storage medium 204 containing untrusted data files which user 202 wishes to access on computer 206. For example, portable storage medium 204 may store tax documents of user 202, and computer 206 may be that of a professional tax preparer. Similarly, portable storage medium 204 may store documents which user 202 wishes to print using computer 206 of a print shop. Alternatively, computer 206 may be that of user 202, and portable storage medium 204 may store their own files. In some embodiments, portable storage medium 204 may be a Universal Serial Bus (USB) drive that can plug directly into computer 206. In other embodiments, portable storage medium 204 may be an externally housed hard drive or other storage medium. In still other embodiments, portable storage medium 204 may be a portable telecommunications device (e.g., a smartphone) of user 202. In yet other embodiments, portable storage medium 204 may be a data capture device such as a camera or scanner that stores data files to internal storage.

Because the data files on portable storage medium 204 are untrusted, they may contain viruses or other forms of malicious software (also called "malware") that can harm computer 206 or otherwise compromise its security, with or without the knowledge of user 202. For example, portable storage medium 204 may be configured with executable programs to automatically execute on being connected to a computer. The owner of computer 206 may not wish to execute such programs, as they may compromise the security of computer 206. Portable storage medium 204 may also contain malicious data files structured to take advantage of vulnerabilities in the software which is configured to open them. For example, a maliciously crafted Portable Document Format (PDF) file might exploit a known vulnerability in the PDF reader of computer 206 to execute code which would otherwise not be allowed.

To prevent such malicious data files from gaining access to (and thereby harming) computer 206, quarantine engine 208 is installed on computer 206, which is then configured such that only quarantine engine 208 can access portable storage medium 204. For example, if portable storage medium 204 connects by USB, then computer 206 is configured such that only quarantine engine 208 can access its USB ports. Thus all data passing onto computer 206 from portable storage medium 204 must do so via quarantine engine 208. Once quarantine engine 208 accesses portable storage medium 204, it can present a list of the available files to user 202 via display 210.

Because all access to portable storage medium 204 is via quarantine engine 208, it can (in some embodiments) filter the file types that can be accessed. For example, if computer 206 is used for preparing tax returns, then it is unlikely that music files or executable files should be permitted to be transferred from portable storage medium 204. As such, music files may not be displayed on display 210, or may be displayed with an indication that they are unavailable for transfer. In other embodiments, specifically allowed file types may be whitelisted instead of specifically forbidden file types being blacklisted. Where whitelisting is used, a file is only available for transfer if it is of a type appearing on a list of permitted file types.

Once user 202 indicates which files on portable storage medium 204 are to be transferred, quarantine engine 208 can begin the process of securely transferring the file or files to local data store 212 of computer 206. Initially, the file or files to be transferred can be scanned for malicious content using signature-based detection techniques. In such scanning techniques, files to be transferred are examined to see if they match signatures (e.g., patterns of bytes) that are known to distinguish malicious file from innocuous files. In this manner, malicious files that have been previously seen and identified as malicious can be immediately flagged without being opened and prevented from infecting computer 206.

If the file does not match any known malware signatures, it can be transferred to local data store 212, and transmitted via network 214 to server 216 for detonation. The process of detonating a file is described in greater detail below, but broadly comprises opening the file in a controlled environment where any adverse impact on the opening computer can be monitored. In some embodiments, server 216 is a virtual machine host, and detonates the file or files in virtual machine 218. In such embodiments, the file can be opened in virtual machine 218 using the associated application, while an associated virtual machine monitor watches for any aberrant behavior by that application that might indicate that the file is malicious. If malicious files are detected, measures can be taken to reverse any harm to computer 206 and add the signature of the malicious file to the list of those which will be scanned for in the future.

Figure 3:
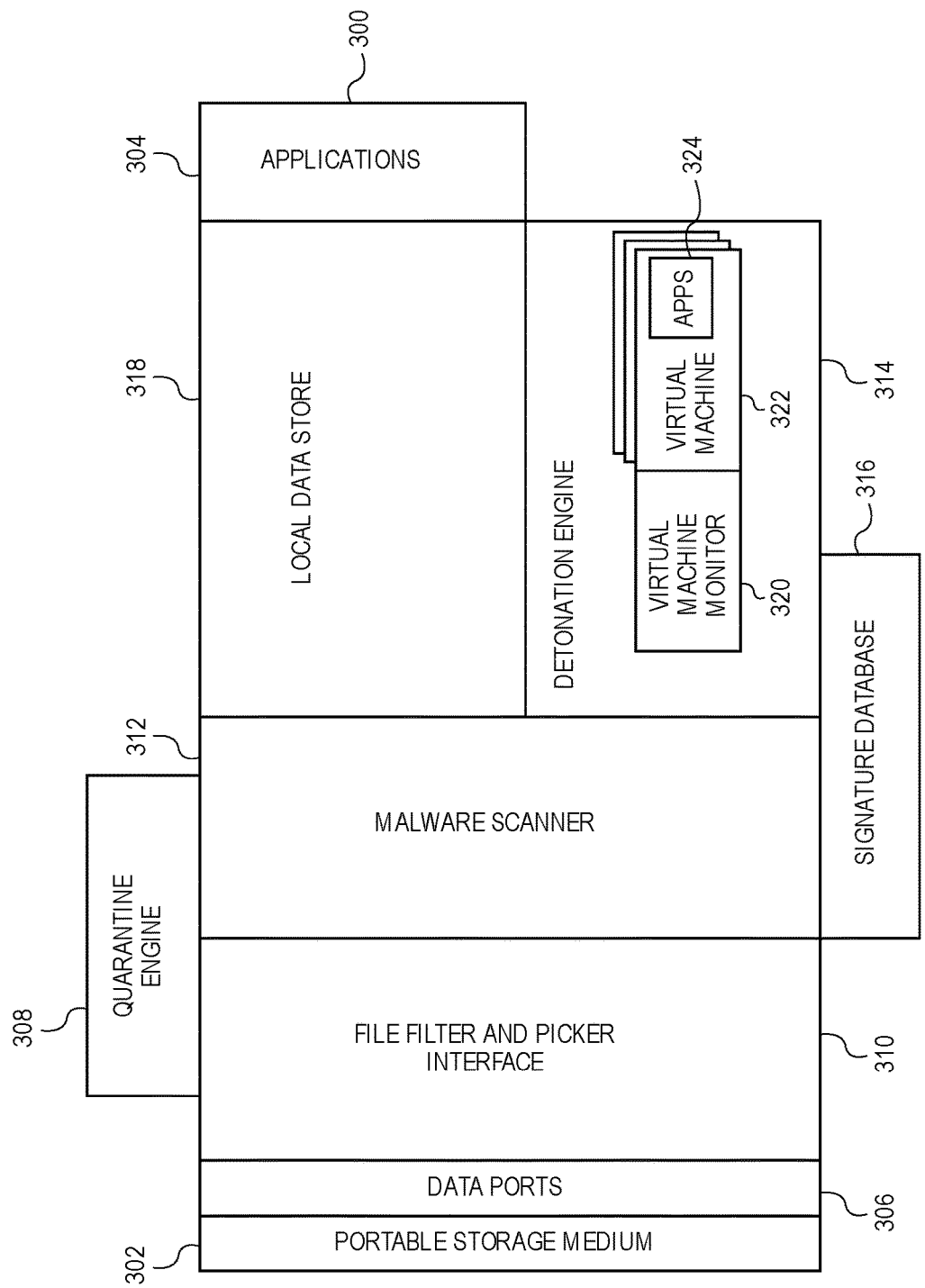
FIG. 3 depicts a block diagram illustrating the components of a system in accordance with embodiments of the invention.

Turning now to FIG. 3, a block diagram illustrating the components of a system in accordance with embodiments of the invention is depicted and referred to generally by reference numeral 300. The components depicted are those involved in the access of portable storage medium 302 by application 304 when it is inserted into data port 306. Conventionally, application 304 has direct access to data ports 306 (via the undepicted operating system), and can read files directly from portable storage medium 302. This means that it is impossible to filter or pre-scan files without operating system integration.

Embodiments of the invention restrict access to data ports 306 to the components of quarantine engine 308. Thus, application 304 cannot access portable storage medium 302 directly, but only via quarantine engine 308. In some embodiments, quarantine engine 308 includes file filter and picker interface 310 and malware scanner 312. In some such embodiments, these components are included in a single executable file with quarantine engine 308. In other embodiments, quarantine engine 308 operates as a controller for separate executables performing the roles of file filter and picker interface 310 and malware scanner 312. In some embodiments, quarantine engine further interfaces with detonation engine 314 to control the release of the quarantined files to application 304 once they have been determined to be safe.

File filter and picker interface 310 performs a twofold role: first, it allows user 202 to indicate which files they desire to access from portable storage medium 302. File filter and picker interface 310 may present the use with a conventional file picker widget or with any other file selection interface. Second, it limits those files that can be accessed to those which are relevant to the role of computer 206, as defined by a transfer policy. For example, if computer 206 is used to interface with a photo printer, then music files, executable files and office documents may simply be made unavailable for selection by file filter and picker interface 310 in accordance with the transfer policy. In this way, the attack surface exposed to malware is immediately limited to that needed for the role of computer 206. In some embodiments, files may be filtered based on type (as determined by file extension or metadata). Thus, if computer 206 is used for printing photographs, then the files available for selection by file filter and picker interface 310 may be liked to those with extension .JPG, .JPEG, .GIF, .PNG, etc., or to those with MIME type image/*. Similarly, if computer 206 is used for preparing tax returns, then file types corresponding to office documents, tax forms, and images may be allowed.

In other embodiments, file filter and picker interface 310 instead filters files based on their contents. For example, if the transfer policy dictates that only image files are permitted to be loaded from portable storage medium 302 into computer 206, then each file on portable storage medium 302 may be inspected to see if it contains actual image data (as evidenced, for example, by the presence of an appropriate image header). In this way, files forbidden by the transfer policy cannot be loaded by changing their extension. In other embodiments, the semantics of the files may be relevant as well. For example, in the example above where computer 206 is used for preparing tax returns, it may be that the transfer policy dictates that only tax-related documents may be loaded from portable storage medium 302. Some (but not all) office documents may satisfy this transfer policy, as may some (but not all) image files, and so on. Thus the semantics of the files must be examined.

In some cases this may be simple. For example, government-provided tax forms will have identical shells, filled in with information particular to the taxpayer. Tax forms provided by banks and payroll processors will contain text identifying the form (e.g., "W-2" or "1099") that can be used to confirm that the file in question is a tax document. However, some tax documents may be scanned PDFs, or captured images of receipts. In such cases, optical character recognition (OCR) of these files may be performed to determine text which can be used to identify files. In such cases, this recognized text can be stored with the file for future reuse by applications 304. Other instances of deep file content inspection to determine if the file in question should be loaded onto computer 206 are also possible.

Once the files have been appropriately filtered and the file or files to be transferred have been selected by user 202, they can be scanned by malware scanner 312. Malware scanner 312 compares each file to be transferred to the malware signatures stored in signature database 316. Each such signature represents the unique characteristics of a piece of previously identified malware. Thus, if a file being scanned matches one of the signatures in signature database 316, then the corresponding piece of malware is present in the file being scanned. A signature broadly comprises a rule for determining whether a file contains a particular piece of malware. For example, a signature may comprise a series of contiguous or non-contiguous bytes or other pattern against which a file being scanned can be matched. If malware is detected in a file, quarantine engine 308 can alert the user and refuse to transfer that file (or, in some embodiments, any file from portable storage medium 302) onto computer 206. Thus malware scanner 312 forms a second line of defense against malicious files.

If no malware is detected in the files being transferred, then they can be stored in local data store 318 and passed to detonation engine 314. In some embodiments, files are made immediately available to applications 304 once they have passed malware scanner 312. In such embodiments, if detonation engine 314 detects malware in the transferred files, the detected malware will already be present on computer 206, and must be cleaned. In other embodiments, the transferred files are kept in isolation until detonation engine 314 determines that no aberrant behavior indicative of malware was caused by the files. In the latter case, detonation engine 314 acts as a third line of defense to prevent malware infections of computer 206. In the former case, it instead acts as a tripwire, detecting when malware is present so that remedial measures can be taken.

Detonation engine 314 may be present on the same computer as quarantine engine 208 and applications 304, or it may be on a separate, dedicated computer connected via the Internet or a local-area network. Broadly speaking, detonating a suspicious file involves opening it in a controlled environment or sandbox, where the application opening the file (or the file itself, if it is an executable file) can be monitored for aberrant behavior. As used herein, the term "aberrant behavior" refers to any behavior by the application in question that is outside of the usual behavior and indicated the presence of malware in the file. Thus, if unauthorized changes are then made in the execution environment, then it can be inferred that the file contained malware. For example, an application to open an office document may be executed in a sandboxed environment. Any attempts to open files outside of this sandbox can then be detected as evidence of aberrant behavior. Where executable files are loaded, they can be run themselves, and any attempted changes to system files can be detected as evidence of aberrant behavior. Similarly, if monitoring the code portion of the in-memory footprint of the application indicated that code has been injected into the application, this may also serve as evidence that malware is present. Other types of aberrant behavior will be apparent to one of skill in the art, and are also contemplated as being within the scope of the invention.

As depicted, detonation engine 314 includes a virtual machine monitor 320 running one or more virtual machines 322. It is an advantage of using virtual machines 322 that the execution of the corresponding virtual application 324 can be monitored. Because the monitoring can be done from outside the virtual machine, there is little opportunity for malware to evade detection. Furthermore, because each file detonation can be done on a fresh copy of a known virtual machine state, changes are easy to detect and revert between file detonations. If detonation engine detects aberrant behavior, a signature of the file can be extracted and added to signature database 316 for future use by malware scanner 312. Otherwise, in those embodiments, where the file or files are kept in quarantine until they have been successfully detonated, the files can be released by quarantine engine 308 to local data store 318 where they can be used by applications 304.

Figure 4:
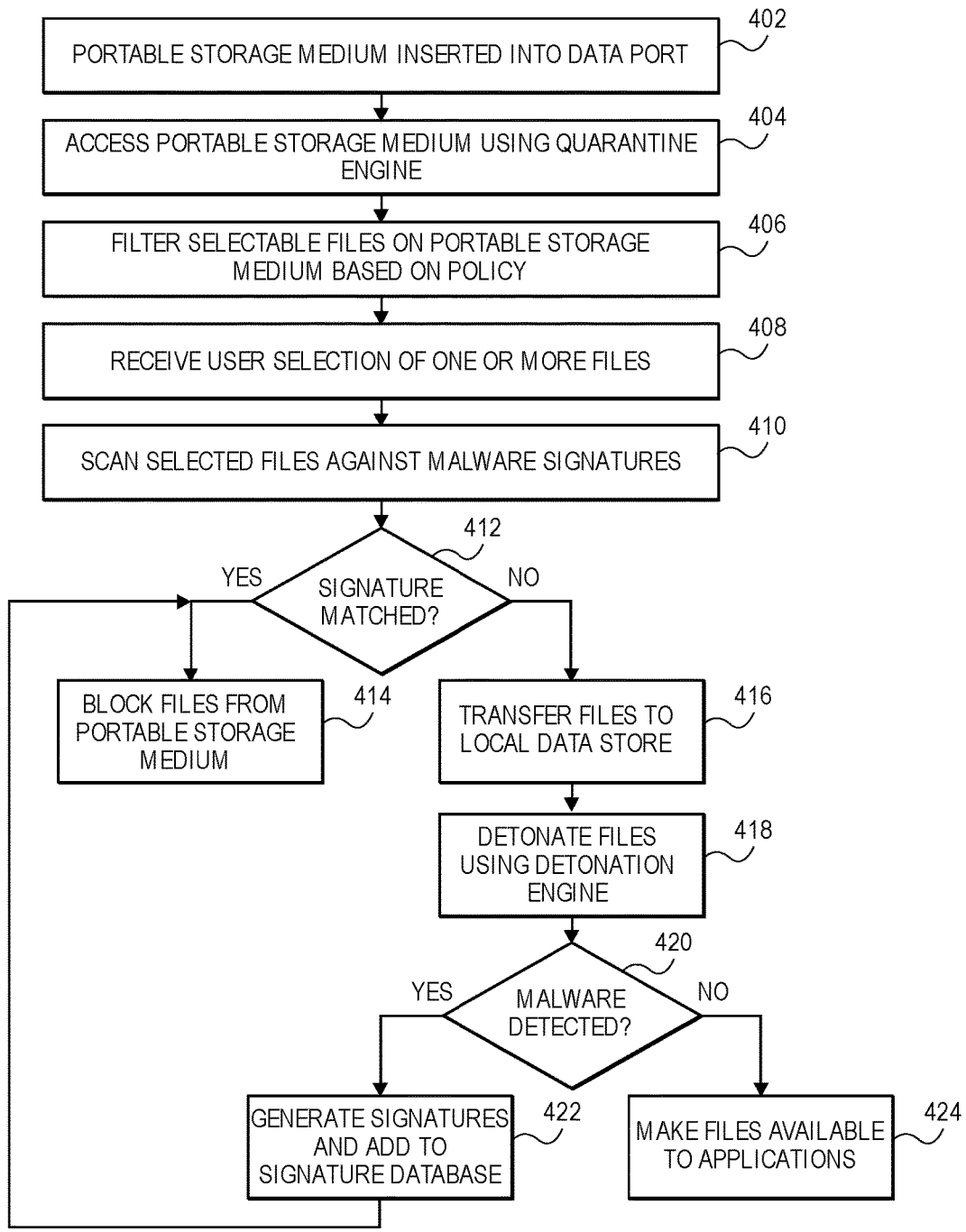
FIG. 4 depicts a flowchart illustrating the operation of a method in accordance with embodiments of the invention.

Turning now to FIG. 4, a flowchart illustrating the operation of a method in accordance with embodiments of the invention is depicted, and referred to generally by reference numeral 400. The process begins when a portable storage medium is inserted into a data port of computer 206 at step 402. Depending on the type of portable storage medium, this insertion may take a variety of forms. For example, a USB thumb drive may be plugged directly into a USB port, or a Secure Digital (SD) card may be plugged into a corresponding reader. A portable hard drive, camera, or portable media device such as a smartphone may be plugged in via a cable. A CD-ROM, DVD-ROM, or other type of disk may be inserted into the corresponding drive. In some embodiments, the files in question may be downloaded into temporary storage location via a network instead of via a portable storage medium.

Next, at step 404, the contents of the portable storage medium are accessed using the quarantine engine. In some embodiments, the system is configured so that only the quarantine engine is able to access the portable storage medium. In this way, applications cannot access files unless they have been scanned by the quarantine engine and verified to be safe. In some embodiments, all access of files, until they have been passed by the quarantine engine, is on the portable storage medium so that malicious files are prevented from even temporary access to the computer in question.

Processing then proceeds to step 406 where the files on the portable storage medium are filtered to the permissible types and presented to the user in an interface allowing the user to select files for transfer. As discussed above, the files on the portable storage medium may be filtered based on their declared file type, their content, or both. Where files are filtered on both their declared type and their content, file type filters may be applied first to reduce the need for deep file content inspection on irrelevant files. In some embodiments, files which are forbidden from being transferred are displayed to the user together with an indication that they cannot be transferred. In other embodiments, only those files permitted to be transferred are displayed to the user for selection.

Next, at step 408, a selection from the user of one or more files to be transferred is received. The user may indicate the files to be transferred using any user-interface convention now known or later developed. At step 410, each of the selected files is scanned against known malware signatures. In some embodiments, each file is scanned as the user selects it for transfer. In other embodiments, the user selects all files to be transferred and then the files are scanned in a batch. When scanning a file, it is compared against each known malware signature in turn. As discussed above, malware signatures may take a variety of forms. In one embodiment, malware signatures are a contiguous or non-contiguous pattern of bytes which, if present in the file, signifies the presence of malware in the file. In other embodiments, files are scanned at a higher semantic level to analyze suspicious patterns of system calls or library calls. In still other embodiments, files are compared to templates for the declared file types. For example, one signature may indicate that any image file with a large header portion but a zero-length content portion contains malware. Another signature might indicate that a fillable form with a field value larger than a prespecified threshold (e.g., 1 MB) contains malware. Other techniques for scanning files against known malware are also contemplated as being within the scope of the invention. In some embodiments, signatures which can be matched more quickly are scanned for first, followed by slower methods if faster signatures are not matched.

Next, at decision 412, it is determined whether the scanned file contained malware. If so, processing proceeds to step 414. Otherwise, processing skips to step 416. In some embodiments, processing proceeds to step 414 if any file scanned contains malware. In other embodiments, processing proceeds individually on a per-file basis (i.e., files determined to be infected with malware are blocked, but other files can still be transferred). At step 414, files from the portable storage medium are blocked from being transferred. In some embodiments, where the file was matched using a slower signature, a faster signature (such as a simple hash) can be generated for that file and added to the signature database so that the file can be detected more quickly if it is seen again.

If decision 412 determined that malware was not present in the file (or collection of files), processing proceeds to step 416. At step 416, files are transferred from the portable storage medium to the local data store. In some embodiments, the files are accessible to applications at this point. In other embodiments, files are kept in quarantine until they have been successfully detonated, and are stored in the local data store so the portable storage medium can be removed from the data port and returned to the owner without waiting for file detonation.

Next, at step 418, each file is transferred to the detonation engine to be detonated. As described above, detonating a file involves opening it in a controlled environment where and suspicious behavior that might indicate the presence of malware can be detected. Broadly speaking, each type of file may be detonated differently. For example, application files can be opened by the corresponding application to that installed on computer 206, while that application is monitored for symptoms of malware such as code injection or memory corruption. Similarly, executable files can be executed while monitoring for unauthorized accesses or modification of system files. Files can be detonated using application virtualization, sandboxing, application isolation (e.g., using the chroot( ) system call) or execution on a virtual machine.

Decision 420 then determines whether detonating the file detected malware. If so, processing proceeds to step 422. Otherwise, processing proceeds to step 424. At step 422, a signature for the detected malware is generated and added to signature data store. In some embodiments, simple, hash-based malware signatures are added. In other embodiments, the signature is specific to the detected malicious behavior. For example, if the detonation engine determines that the file injected code into the application opening it, then the injected code can be used as a pattern-based signature. Other methods of signature extraction are also contemplated as being within the scope of the invention.

Processing then jumps back to step 414, where the infected files from the portable storage medium are blocked on computer 206. If the files in question have been accessed by applications 304, then computer 206 may be marked as infected and remedial measures (such as malware cleaning or re-imaging to a known good state) can be taken to restore computer 206 to an uninfected state. Otherwise, if decision 420 determined that no malware was present, processing proceeds to step 424. There, the files are released from quarantine and made available for use by applications 304 if they were previously kept in isolation.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for the secure importation of digital files from a portable storage medium onto a computer storing a plurality of data files, comprising:
   one or more non-transitory computer-readable media storing computer-executable instructions for a quarantine engine with exclusive access to a data port to which the portable storage medium is connected, such that only the quarantine engine is able to access the portable storage medium, comprising:
- a file filter and picker interface, programmed to:
  - determine, for each data file of the plurality data files, whether the data file is permitted by a transfer policy;
  - present, to the user, each permitted data file of the plurality of data files for selection;
  - receive, from the user, a selected data file to be transferred to the computer;
- a malware scanner, programmed to:
  - compare the selected data file to each malware signature of a plurality of malware signatures; and
  - transfer the data file to a local data store only if the selected data file does not match any of the plurality of malware signatures; and
- one or more non-transitory computer-readable media storing computer-executable instructions for a detonation engine, programmed to:
  - detonate the data file;
  - monitor for aberrant behavior caused by the data file;
  - if aberrant behavior is detected, determine that the data file contains malware and add a signature for the data file to the plurality of malware signatures; and
  - if aberrant behavior is not detected, determine that the data file does not contain malware,
- wherein the detonation engine comprises a virtual machine; and
- wherein detonating the data file comprises opening the selected data file in a corresponding application in the virtual machine and monitoring the application for aberrant behavior.

2. The system of claim 1, wherein the detonation engine further comprises a virtual machine monitor executing a plurality of virtual machines.

3. The system of claim 1, wherein the quarantine engine is further programmed to make the selected data file available to applications on the computer only if the detonation engine determines that the data file does not contain malware.

4. The system of claim 1, wherein:
- the quarantine engine is further programmed to make the selected data file available to applications on the computer if the selected data file does not match any of the plurality of malware signatures, and
- wherein the quarantine engine is further programmed to clean the selected data file from the computer if the detonation engine determines that the data file contains malware.

5. The system of claim 1, wherein the transfer policy determines whether each data file can be transferred based on a file type associated with the data file.

6. The system of claim 1, wherein the transfer policy determines whether each data file can be transferred based on contents associated with the data file.

7. The system of claim 1, wherein the detonation engine detonates the selected data file by opening the selected data file using a virtual application corresponding to an application that would be used to open the selected data file on the computer.

8. A method of securely transferring a data file from a portable storage medium to a computer, comprising the steps of:
- determining that the portable storage medium has been connected to a data port;
- accessing the portable storage medium using a quarantine engine with exclusive access to the data port, such that only the quarantine engine is able to access the portable storage medium;
- determining that the data file is permitted by a transfer policy to be transferred to the computer;
- presenting the data file to a user for selection;
- receiving, from the user, selection of the data file;
- comparing the data file against a plurality of malware signatures;
- determining that the data file does not match any of the plurality of malware signatures;
- transferring the file to a detonation engine;
- detonating the file in a controlled environment while monitoring for aberrant behavior; and
- detecting no aberrant behavior when the file is detonated and, in response, making the data file available to the computer,
- wherein the detonation engine comprises a virtual machine; and
- wherein detonating the data file comprises opening the file in a corresponding application in the virtual machine and monitoring the application for aberrant behavior.

9. The method of claim 8, wherein the transfer policy determines whether each data file can be transferred based on a file type associated with the data file.

10. The method of claim 8, wherein the transfer policy determines whether each data file can be transferred based on contents associated with the data file.

11. The method of claim 8, wherein the data file is opened in the virtual machine by executing it on the virtual machine.

12. The method of claim 8, further comprising the step of making the data file temporarily available to the computer after the data file has been compared against the plurality of malware signatures and before the data file has been detonated.

13. One or more non-transitory computer-readable media storing computer-executable instructions that, when executed by a processor, perform a method of securely transferring a data file from a portable storage medium to a computer, comprising the steps of:
- determining that the portable storage medium has been connected to a data port;
- accessing the portable storage medium using a quarantine engine with exclusive access to the data port, such that only the quarantine engine is able to access the portable storage medium;
- determining that the data file is permitted by a transfer policy to be transferred to the computer;
- presenting the data file to a user for selection;
- receiving, from the user, selection of the data file;
- comparing the data file against a plurality of malware signatures;
- determining that the data file does not match any of the plurality of malware signatures;
- making the data file available on the computer;
- transferring the file to a detonation engine;
- detonating the file in a controlled environment while monitoring for aberrant behavior; and
- detecting aberrant behavior when the file is detonated and, in response, generating a malware signature for the data file and adding it to the plurality of malware signatures,
- wherein the detonation engine comprises a virtual machine; and wherein detonating the data file comprises opening the data file in a corresponding application in the virtual machine and monitoring the application for aberrant behavior.

14. The media of claim 13, wherein the transfer policy determines whether each data file can be transferred based on a file type associated with the data file.

15. The media of claim 13, wherein the transfer policy determines whether each data file can be transferred based on contents associated with the data file.

* * * * *